Oct. 17, 1967  R. BRANDT ETAL  3,347,419
COLLAPSIBLE DISPENSING TUBE
Filed Jan. 21, 1965
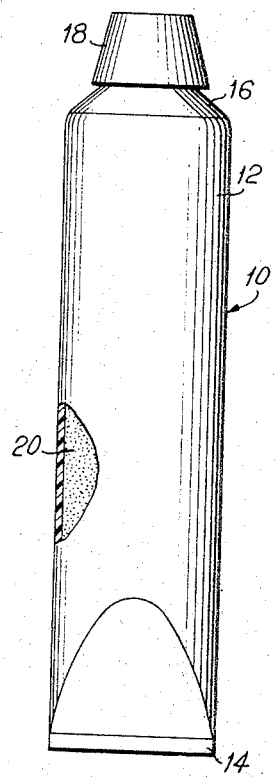
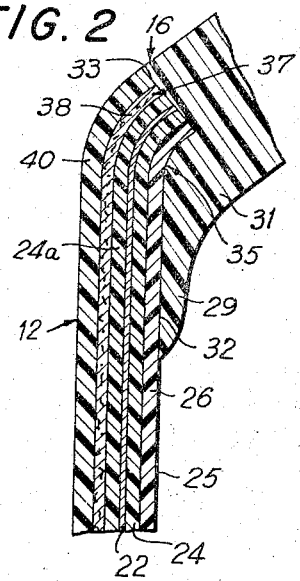
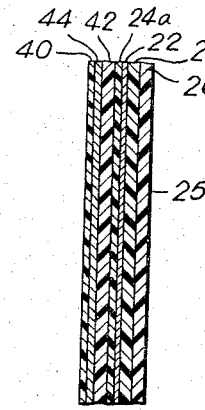
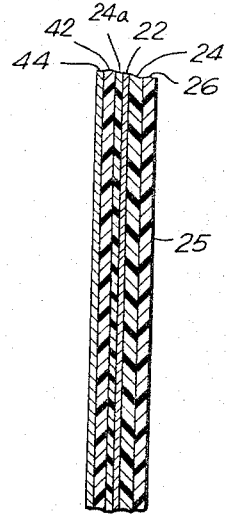
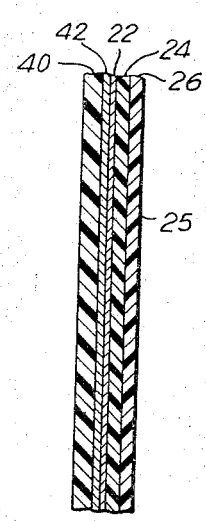
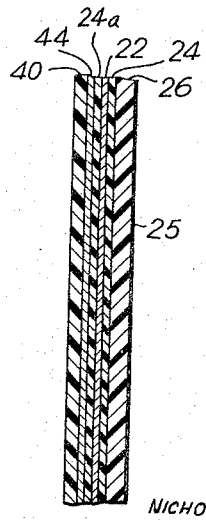
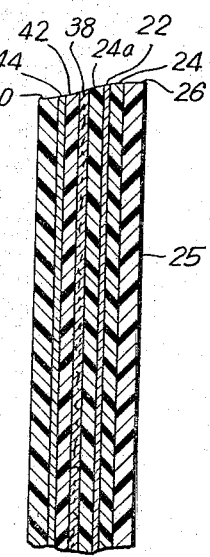
INVENTORS
NICHOLAS MICHAEL MESTANAS
ROGER BRANDT
BY
*Leonard R. Kohan*
ATTORNEY

United States Patent Office 3,347,419
Patented Oct. 17, 1967

3,347,419
COLLAPSIBLE DISPENSING TUBE
Roger Brandt, Short Hills, and Nicholas Michael Mestanas, Jersey City, N.J., assignors to American Can Company, New York, N.Y., a corporation of New Jersey
Filed Jan. 21, 1965, Ser. No. 426,736
7 Claims. (Cl. 222—107)

The present invention relates to collapsible dispensing tubes and, more particularly to tubes formed from a laminated material.

Collapsible dispensing tubes made of both metallic and plastic materials are well known. The metal tubes are impermeable to moisture and volatile oils and, therefore, are widely used for packaging pharmaceutical products, cosmetics, toiletries and the like which contain these ingredients. They are also impervious to oxygen and hence, capable of protecting a container product against deterioration from this source.

However, the metal tubes such as are made from lead or aluminum are costly to produce due to the high material cost and the manner in which the tubes must be made. This includes individual printing of each tube with suitable decorative material after it has been formed. Moreover, the chemical nature of the metals used often makes necessary the extra step of completely coating the interior of the tube with a protective layer so as to preclude attack and corrosion of the metal by alkaline or acid contents resulting in contamination of the contents by the reaction products.

On the other hand, plastic tubes are relatively inert and are better suited for many products that attack metal. Unfortunately, the thin body wall of the plastics generally used is apt to be permeable, in varying degrees, to moisture, certain essential oils, perfumes, flavorings and other volatile ingredients. Consequently, there is often a considerable loss of the volatile oils and moisture during storage, resulting in some deterioration or dehydration of contained products such as toothpaste, shaving cream, medicinal ointments, etc. Too, many plastics favored for plastic tube manufacture are oxygen permeable and are inferior to metal tubes in this respect.

Even where permeability is not a factor, plastic tubes have a further serious disadvantage in that printing or decorative material applied to the surface of the plastic will often not adhere readily, unless the plastic surface is first treated in some manner. This is an additional expense contributing to the cost of these tubes.

It is therefore an object of the present invention to provide a collapsible dispensing tube which will overcome the problems hereinbefore discussed.

Another object is to provide a tube which substantially combines the desired features of both the metal and plastic tubes.

An additional object is to provide an improved laminated tube construction wherein the layers or plies are resistant to delamination.

Yet another object is to provide a tube having a high degree of impermeability to oxygen, moisture and volatile oils.

A further object is to provide a collapsible tubular container which may be decorated prior to forming the tube from flat stock.

Numerous other objects and advantages of the invention will be apparent as it is better understood from the following description, which, taken in connection with the accompanying drawings, discloses a preferred embodiment thereof.

The above objects are accomplished by providing a laminated collapsible dispensing tube having an intermediate layer of metal foil and an inner layer of thermoplastic forming an interior surface of the tube. The inner layer of thermoplastic is adhesively bonded to the foil layer by means of a suitable material that will prevent delamination of the layer through product attack. The outer surface of the foil layer is covered by suitable layer means for protection in handling, and decoration is also provided for aesthetic purposes.

Referring to the drawings:

FIGURE 1 is a side elevation of a collapsible dispensing tube with portions of the body wall broken away;

FIG. 2 is an enlarged partial sectional view showing the fused joint between the tube body and the headpiece;

FIGS. 3–7 are fragmentary enlarged sectional views of the body wall illustrating various laminated structures.

As a preferred or exemplary embodiment of the instant invention, FIG. 1 shows a collapsible tube, generally designated 10, having a tubular body 12 having a longitudinally extending side seam which ordinarily is closed at one end after filling by heat sealing or other techniques as at 14. The tubular body 12 mounts at its opposite end a plastic headpiece 16 which is usually shaped to provide a threaded neck so that a cap 18 may be secured thereto when the tube 10 is filled with product 20. However, other headpiece configurations may be employed without departing from the scope of the invention.

The headpiece 16 is preferably fused to the body by a suitable procedure such as described in United States Patent 2,673,374.

The tubular body 12 in the embodiment illustrated in FIG. 2 comprises a plurality of layers laminated or otherwise bonded one to the other, although as will be noted later, particular applications may permit a reduction in the number of layers, while other applications may render desirable the use of more layers in the laminate. However, as shown in FIG. 2, the body 12 comprises an intermediate foil layer 22 which provides the barrier protection against oxygen absorption from the atmosphere and essential oil permeation outwardly through the tube body 12. The thickness of this metallic foil is sufficient to impart the requisite barrier properties and yet is maintained relatively thin in the interests of cost and pliability of the container during use. Aluminum foil has been found particularly suitable for this use, although other metallic foils such as steel or tin plate may also be utilized. In general, when aluminum foil is used, a thickness of approximately 0.0007 inch has been found to be satisfactory to facilitate handling and assuring that no pin holes will be present in the material.

On either side of the foil layer 22 is a bonding layer 24, 24a which may be any adhesive that will effectively bond the next layer in the laminate structure and will prevent delamination of the layers due to product attack or abusive handling.

Where the next adjacent layers in the laminate are materials which do not readily adhere to metals, such as polyolefins and other resins, a special synthetic resin is preferred for the bonding layers. Such a synthetic resin, preferred for the bonding layer in the instant invention, is a copolymer of ethylene and either an acrylic acid or an acrylic acid ester hereinafter referred to as copolymer. The acrylic acids useful are acrylic acid, methacrylic acid and ethacrylic acid. The acrylic acid esters include: methyl and ethyl acrylate; methyl and ethyl methacrylate; and methyl and ethyl ethacrylate. All of these a,b unsaturated acids and their esters conform to the general formula $$CH_2=CR-COOR'$$

where R and R' are hydrogen or lower alkyl, particularly methyl or ethyl radicals. This resin has been found to be especially effective in bonding polyolefins to aluminum.

Forming the inner surface 25 of the body 12 is a thermoplastic layer 26 which is bonded to the foil layer 22 by means of the copolymer layer 24. This thermoplastic layer 26 is preferably a polyolefin, generally taking the form of a low density polyethylene. When the polyethylene layer 26 is approximately 0.002 inch thick, it is preferred that the copolymer layer 24 have a similar thickness. When the copolymer is somewhat expensive, it is readily apparent that the use of polyethylene will also reduce the overall cost of materials.

The preference for the inner layer 26 in the laminate being polyethylene is due to the problems encountered in joining the headpiece 16 to the tube body 12. A number of factors are thought to be responsible for this difficulty.

The first of these is due to the relatively limited amount of heat available during the molding of the headpiece for effecting the fused connection between the headpiece and the body 12. It has been found that polyethylene does not bond readily to the types of copolymer contemplated for the tube constructions of this invention unless substantial heat is available for the fusion. Improper bonding of the headpiece 16 to the body 12 would, of course, result in leakage or possibly even separation of the headpiece 16 from the body 12.

It is thought that the necessity for large quantities of heat when bonding polyethylene to the copolymer is due to oxidation of the copolymer under standard atmosphere conditions. Thus, an oxidized layer of material on the surface of the copolymer must be melted before fusion can occur between the molten thermoplastic headpiece and the copolymer surfaced tube body.

By utilizing a thermoplastic less susceptible to oxidation, such as a polyolefin and especially polyethylene, as the inner surface of the body 12 to which the substantial portion of the fused connection depends, the problems encountered in fusing the headpiece 16 to the body 12 have largely been obviated.

Although a similar problem does exist in forming a side seam in a tube body when a polyolefin-copolymer fusion is needed, this has not been found to be a serious matter. Little difficulty has been encountered in forming a polyolefin-copolymer bond in the side seam due to the fact that the required heat can be made available by the sealing tools used in formation of the side seam.

In bonding the headpiece 16 to the body 12 utilizing the method disclosed in U.S. Patent 2,673,374, the headpiece 16 is provided with a cylindrical skirt portion 29 and a peripheral inwardly curved portion 31 which are bonded to the tube body 12 at its upper marginal inner surface 32 and upper edge 33 forming a head joint 35. The continuous peripheral and vertical fused areas of the joint 35 result in a strong attachment of the headpiece 16 to the tube body 12 with a high resistance to separation by either axial, radial, or twisting forces or combinations thereof. Preferably, the upper end 37 of the tube body 12 is turned in slightly and recessed into the headpiece 16 with the edge 33 of the body welded to the material of the head so that the outer surface of the joint 35 is a smooth substantially uninterrupted surface.

In the remainder of the body laminate in this embodiment, a fibre layer 38 is bonded to the exterior of the foil layer 22 by means of another bonding layer 24a. This outer layer 24a may be the same copolymer as inner layer 24. However, the adhesive utilized may sometimes differ from that used in bonding metal to a polyolefin, since the bonding characteristics of fiber to metal are different from that of metal to polyolefin. Many forms of paper may be used for this fiber layer 38. However, it has been found that wet strength glassine having a thickness of from 0.001 to 0.0045 inch is adequate. The thin paper serves both to increase the strength of the laminate and also to provide a background for tube decoration.

Overlying the fiber layer 38 and forming the exterior surface of the tube is a substantially transparent layer of clear resin 40. This resin layer 40 serves to protect the tube body 12 from abuse during handling and also to effectively seal the laminate collapsible tube 10 from absorbing any liquids that may come in contact with its exterior surface. Although this clear resin may be any of a number that are suitable for and compatible with both the laminate structure and its ultimate use, it is preferred that a polyolefin such as clear polyethylene having a thickness of at least 0.001 inch be used. It is thus readily apparent that any decoration or indicia (not shown) that may be placed on the surface of the fiber layer 38 will be protected and be visible through the clear polyethylene 40. This decoration is preferably printed in the flat before the laminate material is formed into the tubular body 10, thus permitting greater versatility and economy than is ordinarily possible with preformed tube bodies.

It will therefore be understood from the above description and FIG. 2 that a substantial fusion zone is created between the readily fusible materials of the headpiece 16 and inner surface 32 of inner polyolefin layer 25, in the vertical area of joint 35, as well as with the end surfaces of layers 25 and 40 in the peripheral area of the joint. Throughout this entire joint, the actual contact between the headpiece 16 and the not-so-readily fusible copolymer layers 24 and 24a is slight, thereby minimizing any derogation of the desired fusion which otherwise could result due to the tendency of the copolymer to oxidize.

In a modified form of the invention, as shown in FIG. 3, the three interior layers 22, 24, 26 of the laminate are similar to that hereinbefore described and perform similar functions. However, instead of a paper layer 38 being bonded to the foil layer 22 by means of the adhesive 24a, a layer of substantially opaque thermoplastic 42 is used as the base upon which an indicia is placed. It is preferable that this opaque thermoplastic layer 42 be a polyolefin such as polyethylene having a thickness of from 0.001 to 0.004 inch. In this instance, it is preferred that the outer bonding layer 24a is of the same copolymer material as inner bonding layer 24.

An indicia or decoration 44 is applied to the opaque thermoplastic layer 42 by means known to those skilled in the art. Generally, this indicia 44 is an ink form and is applied while the laminate is still in the flat form before the initial step of forming the tube. Some prior surface treatment of the opaque polyolefin layer 42 ordinarily is required to improve the receptivity of the decoration 44. The decoration is then covered with a thin transparent resin layer 40, such as clear polyethylene on the order of 0.001 inch thick as in the preceding embodiment, thus sealing the indicia 44 into the tube wall and protecting the indicia 44 from marring or scratching in subsequent handling while the tubes are being filled, shipped, etc.

In a further modification of the invention, as shown in FIG. 4, the inner layers 22, 24 and 26 are as described hereinbefore. In this construction an opaque thermoplastic layer 42 similar to that shown and described in FIG. 3 is also utilized. Upon this layer 42 is imprinted the indicia 44, after suitable treatment of the layer 42 to improve receptivity. However, in this modification no coating is placed over the indicia but the indicia itself forms the exterior surface of the tube body.

In the tube construction shown in FIG. 5, the indicia or decoration 44 is applied directly to the intermediate foil layer 22. Thus, the outer bonding 24a of the preceding embodiment is omitted. The interior layers 24 and 26 are similar to that described hereinbefore. Since the indicia 44 is placed directly on the metal foil 22, no prior surface treatment to increase ink adherence is required as is the case where the indicia 44 is applied directly to a thermoplastic surface. Thus, since one of the bonding layers 24 may be omitted and no surface treatment of a thermoplastic layer is necessary, the processing costs are substantially reduced. This type of decoration is, however, limited due to different surface requirements for different indicia. In order to protect the indicia 44 it is sealed into the tube well beneath an outer layer of clear resin 40 as in the embodiment shown in FIG. 3. This clear resin 40 in this embodiment, preferably polyethylene, has a thickness of approximately 0.003 inch to provide adequate protection for the indicia 44 and add strength to the body 12.

In the construction shown in FIG. 6, the bonding layer 24 between the foil 22 and the inside thermoplastic layer 26 is similar to FIG. 5, with variations in thickness of the layers 24 and 26 to compensate for the added thickness of the outer bonding layer 24a. With this construction, the inner bonding layer 24 is approximately 0.001 inch while the thermoplastic layer 26 is approximately 0.003 inch.

In order to further minimize material usage in this construction and thus reduce costs, the outer bonding layer 24a is also approximately 0.001 inch thick and is preferably opaque as is the case with the aforementioned copolymer. The indicia 44 is applied directly upon the opaque bonding layer 24a and is itself then covered with the clear or transparent resin 40, which has a thickness of approximately 0.002 inch. If it is desired that the background for the indicia 44 be of a metallic nature, then the adhesive layer 24 upon which the indicia 44 is imprinted is transparent, thus providing the metallic foil 22 as the background.

Another alternate body laminate, as shown in FIG. 7, comprises an intermediate foil layer 22, as hereinbefore described, with bonding layers 24, 24a on either side. Forming the inner surface of the laminate is a thermoplastic layer 26, which is bonded to the foil layer 22 by means of the copolymer layer 24. This thermoplastic layer 26 is preferably a polyolefin, generally taking the form of a low density polyethylene. It is preferred that the combined thickness of the layers 24, 26 be approximately 0.004 inch.

Bonded to the outer copolymer layer 24a is a layer of fibre 38 over which is bonded a layer of opaque thermoplastic 42, preferably polyethylene. As was discussed before, the surface of the opaque thermoplastic layer 42 is treated by means well known to those skilled in the art to make it receptive for printing. Thus, an indicia 44 is placed upon the opaque layer 42. The background afforded this indicia 44 is thus quite dense due to the multiple fibre and opaque thermoplastic layers 38, 42. Overlying the indicia 44 and forming the external surface of the tube is a substantially transparent layer of clear resin 40, a polyolefin, such as polyethylene, being preferred, which is thick enough to afford protection of the indicia 44 during any handling of the tube body.

It is thought that the invention and many of its attendant advantages will be understood from the foregoing description and it will be apparent that various changes may be made in the form, construction, and arrangement of the parts without departing from the spirit and scope of the invention or sacrificing all of its material advantages; the form hereinbefore described being merely a preferred embodiment thereof.

We claim:
1. In a collapsible dispensing container having a laminated tubular body and a thermoplastic dispensing head piece fused thereto wherein said body includes a fluid impervious metal foil lamination, and a lamination o bonding material connecting said headpiece to said body the improvement in said bonding material to insure connection of said headpiece to said body withou delamination of said bonding material from said foi or disconnection of said headpiece from said bondin material comprising:
a first layer thereof overlying said foil and adhering thereto, said layer comprising a copolymer of ethylene and a member of the group consisting of an acrylic acid and an acrylic acid ester,
a second layer overlying said first layer and adhering thereto on one side thereof, and fused to said headpiece on the other side thereof at one end of said body to form the principal connection thereto, said second layer being a polyolefin.
2. The improved container of claim 1 wherein said second layer is polyethylene.
3. The improved container of claim 1 wherein said headpiece is injection-fused to said second layer.
4. The improved container of claim 3 wherein said headpiece and said second layer are each polyethylene.
5. The improved container of claim 1 wherein said second layer is the innermost layer of said tubular body.
6. A pre-formed collapsible tubular body of laminated construction for internally mounting an injection-molded thermoplastic headpiece in fused relation thereto, comprising
a tubular layer of fluid-impervious metal foil,
a tubular layer of a copolymer of ethylene and a member of the group consisting of an acrylic acid and an acrylic acid ester, said copolymer being bonded to the inner side of said foil,
and a tubular layer of a polyolefin, said polyolefin being bonded to the inner side of said copolymer to define the innermost layer of said body for reception of said headpiece.
7. The tubular body of claim 6 wherein said polyolefin layer is polyethylene.

References Cited
UNITED STATES PATENTS

| | | | |
|---|---|---|---|
| 2,205,466 | 6/1940 | Caprio et al. | |
| 2,605,018 | 7/1952 | Croce et al. | 222—107 |
| 2,804,416 | 8/1957 | Phillipsen. | |
| 2,953,551 | 9/1960 | White | 260—86.7 |
| 3,172,571 | 3/1965 | Marchak | 222—107 |
| 3,215,678 | 11/1965 | Adelman | 161—216 X |
| 3,260,410 | 7/1966 | Brandt et al. | 222—107 |

ROBERT B. REEVES, *Primary Examiner.*

F. R. HANDREN, *Assistant Examiner.*